United States Patent Office 3,732,237

Patented May 8, 1973

3,732,237

5-NITRO-2-THIAZOLECARBOXAMIDOXIME AND DERIVATIVES THEREOF

Uwe Treuner, Regensburg, and Hermann Breuer, Burgweinting, Germany, assignors to E. R. Squibb & Sons, Inc., Princeton, N.J.

No Drawing. Filed May 25, 1971, Ser. No. 146,813
Int. Cl. C07d *91/32*
U.S. Cl. 260—302 R 9 Claims

ABSTRACT OF THE DISCLOSURE 5-nitro-2-thiazolecarboxamidoxime may be used to produce a series of derivatives which are useful as antimicrobial agents.

SUMMARY OF THE INVENTION

This invention relates to 5-nitro-2-thiazolecarboxamidoxime and to a series of derivatives which are useful as antimicrobial agents. These derivatives, which may be derived from 5-nitrothiazole-2-carboxamidoxime, have the formula (I)

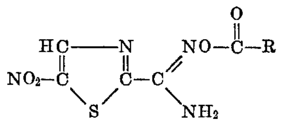

R is lower alkyl or substituted lower alkyl, lower alkenyl, aralkyl, substituted aralkyl, furyl or 5-nitrofuryl.

DETAILED DESCRIPTION OF THE INVENTION 5-nitro-2-thiazolecarboxamidoxime has the formula (II)

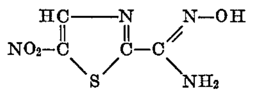

This compound is produced by reacting 5-nitrothiazole-2-carbonitrile with hydroxylamine or with a salt thereof, e.g., a hydrohalide like the hydrochloride, the latter in the presence of an agent like sodium carbonate or sodium bicarbonate, in an inert organic solvent like alcohol, dioxane or tetrahydrofuran, at a temperature of about 0 to 50° C., preferably about room temperature.

By reacting the 5-nitro-2-thiazolecarboxamidoxime with an acid anhydride or acid halide, which may be unsubstituted or substituted, a series of derivatives having the structural Formula I is obtained. The reaction with the acid anhydride or acid halide is effected in the presence of an acid binding agent, e.g., an organic base such as triethylamine, pyridine or the like, in an inert organic solvent, such as dioxane, benzene or the like, at a temperature of about 0 to 50° C., preferably about room temperature.

The acid halide reactant has the formula (III) R—CO—hal wherein R has the meaning defined above and hal refers to halogen, preferably chlorine or bromine. The corresponding acid anhydride has the formula (IV) $(R—CO)_2O$ The lower alkyl and lower alkenyl groups represented by R are straight or branched chain saturated or monounsaturated hydrocarbon groups having 1 to 8 carbon atoms, e.g., methyl, ethyl, propyl, isopropyl, butyl, isobutyl, t-butyl, vinyl, allyl, crotyl and the like. Those groups having up to four carbons are preferred. The lower alkyl groups may be substituted, bearing a halogen, preferably chlorine or bromine and not more than two of these, a lower alkoxy group, e.g., methoxy, ethoxy, propoxy or the like, or a cyclic group, e.g., 2-norbornyl or 1-adamantyl, either alone or with a halogen, especially chlorine. R may also represent an aralkyl group, i.e., a phenyl-lower alkyl group such as benzyl or phenethyl and these aralkyl groups may bear a halogen, preferably chlorine, on the phenyl ring. In addition, R may be furyl or 5-nitrofuryl.

The new compounds of this invention are useful as antimicrobial agents and may be used to combat infections in animal species, such as mice, rats, dogs, guinea pigs and the like, due to organisms such as *Trichomonas vaginalis, Trichomonas foetus, Staphylococcus aureus, Salmonella schottmuelleri, Klebsiella pneumoniae, Proteus vulgaris, Escherichia coli* or *Trichophyton mentagrophytes*. For example, a compound or mixture of compounds of Formula I or physiologically acceptable acid addition salt or quaternary ammonium salt thereof may be administered orally to an infected animal, e.g., to a mouse, in an amount of about 5 to 25 mg. per kg. per day in 2 to 4 divided doses. These may be conventionally formulated in a tablet, capsule or elixir containing about 10 to 250 mg. per dosage unit, by compounding the active substance or substances with the conventional excipient, vehicle, binder, preservative, flavor, etc., as called for by accepted pharmaceutical practice. They may also be applied topically, e.g., to dermatophytosis in a guinea pig, in a lotion salve or cream at a concentration of about 0.01 to 3 percent by weight.

They may also be used as surface disinfectants. About 0.01 to 1 percent by weight of any of these substances may be dispersed on an inert solid or in a liquid such as water and applied as a dust or spray. They may be incorporated also, for example, in a soap or other cleaning agent, e.g., a solid or liquid detergent, detergent composition, for example, in general cleaning, in cleaning dairy barns or equipment or cleaning food handling or processing equipment.

The following examples are illustrative of the invention. All temperatures are on the centigrade scale.

Example 1

1.5 gm. (10 mmol.) of 5-nitrothiazole-2-carbonitrile (J. Med. Chem. 1969, p. 303) are dissolved in 50 ml. of absolute ethanol and to the solution are added 0.86 gm. (12 mmol.) of hydroxylamine hydrochloride and 1 gm. (12 mmol.) of sodium bicarbonate with stirring. The mixture is stirred for 20 hours at room temperature. The yellow precipitate of 5 - nitro - 2 - thiazolecarboxamidoxime is filtered off. By diluting the filtrate an additional amount of product is obtained, M.P. 213°.

Example 2

1.9 gm. (10 mmol.) of 5-nitro-2-thiazolecarboxamidoxime are dissolved in 20 ml. of absolute dioxane and treated with 1.9 gm. (11 mmol.) of chloroacetic anhydride dissolved in a small amount of dioxane. The orange-yellow color of the reaction mixture quickly disappears. After stirring for two hours at 50°, heating for another twenty minutes, then cooling, the dioxane is distilled off in a rotary evaporator. The solid residue is thoroughly washed with ice water and then recrystallized first from methanol-water and then from n-butanol. The O-chloroacetyl - 5 - nitro - 2 - thiazolecarboxamidoxime melts at 162–164°.

By following the procedure of Example 2 and substituting for the chloroacetic anhydride the substance $(R—CO)_2O$, wherein R is the group indicated in the table, then the substituted 5-nitro-2-thiazolecarboxamidine having the same R group, as indicated in the following table, is obtained:

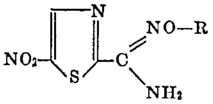

| R | M.P. (° C.) |
|---|---|
| $-CO-CH_2-Br$ | 175-177 |
| $-CO-CH_3$ | 197-199 |
| $-CO-CH-Cl_2$ | 141-143 |
| $-CO-CH_2CH_2Cl$ | 150-152 |
| $-CO-CH_2OC_2H_5$ | 140-143 |
| $-CO-CH=CHCH_3$ | 205-207 |
| 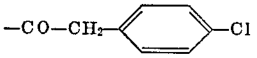 | 182-185 |
| 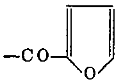 | 219-222 |
| 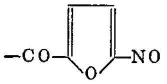 | 218-221 |
| $-CO-C(CH_3)_3$ | 254-255 |
| 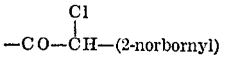 | 173 |
| 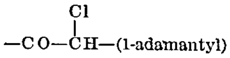 | 157 |

Other variations within the scope of the claims may be obtained by substituting the appropriately substituted anhydride in the foregoing procedure.

What is claimed is:

1. 5-nitro-2-thiazolecarboxamidoxime.

2. A compound of the formula

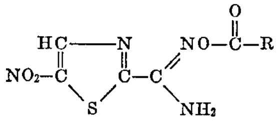

wherein R is lower alkyl, lower alkyl substituted with halogen, lower alkoxy, 2-norbornyl of 1-adamantyl, lower alkenyl, phenyl-lower alkyl, halophenyl-lower alkyl, furyl or 5-nitrofuryl.

3. A compound as in claim 2 wherein R is lower alkyl.

4. A compound as in claim 3 wherein the lower alkyl group is methyl.

5. A compound as in claim 2 wherein R is halo-lower alkyl.

6. A compound as in claim 5 wherein the halo-lower alkyl group is chloromethyl.

7. A compound as in claim 5 wherein the halo-lower alkyl group is dichloromethyl.

8. A compound as in claim 1 wherein R is lower alkenyl.

9. A compound as in claim 8 wherein the lower alkenyl group is propyl.

References Cited

UNITED STATES PATENTS 3,574,737 4/1971 Grigat et al. ........ 260—302

ALEX MAZEL, Primary Examiner

R. J. GALLAGHER, Assistant Examiner

U.S. Cl. X.R.

260—347.3, 546; 474—270